(12) United States Patent
Buskens et al.

(10) Patent No.: US 7,627,871 B2
(45) Date of Patent: Dec. 1, 2009

(54) INSTRUCTING MANAGEMENT SUPPORT SOFTWARE OF A FIRST SOFTWARE COMPONENT TO SET UP A COMMUNICATION CHANNEL BETWEEN THE FIRST SOFTWARE COMPONENT AND A SECOND SOFTWARE COMPONENT

(75) Inventors: Richard W. Buskens, Robbinsville, NJ (US); Yow-Jian Lin, Edison, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 854 days.

(21) Appl. No.: 10/868,128

(22) Filed: Jun. 14, 2004

(65) Prior Publication Data

US 2005/0289093 A1 Dec. 29, 2005

(51) Int. Cl.
*G06F 9/46* (2006.01)
(52) U.S. Cl. ...................................... 719/313
(58) Field of Classification Search ................ 719/316, 719/313; 717/120
See application file for complete search history.

(56) References Cited

U.S. PATENT DOCUMENTS

| | | | |
|---|---|---|---|
| 5,396,630 A * | 3/1995 | Banda et al. | 719/316 |
| 6,477,586 B1 * | 11/2002 | Achenson et al. | 719/330 |
| 6,704,785 B1 * | 3/2004 | Koo et al. | 709/227 |
| 6,745,382 B1 * | 6/2004 | Zothner | 717/107 |
| 6,941,557 B1 * | 9/2005 | Jakobson et al. | 719/316 |
| 2003/1004644 * | 3/2003 | Maryka et al. | 709/316 |
| 2003/0208640 A1 * | 11/2003 | Just | 709/330 |

OTHER PUBLICATIONS

Lucent Technologies Inc., "Statement Disclosing Information About Development and Use of Technology", 2002 to 2004, 3 pgs., Murray Hill, NJ, USA.

* cited by examiner

*Primary Examiner*—Van H Nguyen
*Assistant Examiner*—Phuong N Hoang
(74) *Attorney, Agent, or Firm*—Carmen Patti Law Group, LLC (57) ABSTRACT

An apparatus in one example comprises a manager component that upon receipt of an indication of a need for a communication channel between a first software component and a second software component, instructs management support software of the first software component to set up the communication channel between the first software component and the second software component.

18 Claims, 2 Drawing Sheets

INSTRUCTING MANAGEMENT SUPPORT SOFTWARE OF A FIRST SOFTWARE COMPONENT TO SET UP A COMMUNICATION CHANNEL BETWEEN THE FIRST SOFTWARE COMPONENT AND A SECOND SOFTWARE COMPONENT

CROSS-REFERENCE TO RELATED APPLICATIONS

This application contains subject matter that is related to the subject matter of the following applications, which are assigned to the same assignee as this application. The below-listed applications are hereby incorporated herein by reference in their entireties.

"SELECTING A PROCESSOR TO RUN AN EXECUTABLE OF A DISTRIBUTED SOFTWARE APPLICATION UPON STARTUP OF THE DISTRIBUTED SOFTWARE APPLICATION," by Buskins, et al., Ser. No. 10/868,404, filed on Jun. 14, 2004;

"SOFTWARE COMPONENT INITIALIZATION IN AN ORDERED SEQUENCE," by Buskins, et al., Ser. No. 10/867,945, filed on Jun. 14, 2004, now U.S. Pat. No. 7,509,630;

"SHUTTING DOWN A PLURALITY OF SOFTWARE COMPONENTS IN AN ORDERED SEQUENCE," by Buskins, et al., Ser. No. 10/868,142, filed on Jun. 14, 2004, now U.S. Pat. No. 7,426,715;

"DISTRIBUTED SOFTWARE APPLICATION SOFTWARE COMPONENT RECOVERY IN AN ORDERED SEQUENCE," by Buskins, et al., Ser. No. 10/867,590, filed on Jun. 14, 2004, now U.S. Pat. No. 7,366,949;

"MANAGER COMPONENT FOR CHECKPOINT PROCEDURES," by Buskins, et al., Ser. No. 10/868,127, filed on Jun. 14, 2004;

"MANAGER COMPONENT THAT CAUSES FIRST SOFTWARE COMPONENT TO OBTAIN INFORMATION FROM SECOND SOFTWARE COMPONENT," by Buskins, et al., Ser. No. 10/868,469, filed on Jun. 14, 2004;

"FIRST AND SECOND MANAGER COMPONENTS THAT COMMUNICATE TO INITIALIZE AND/OR SHUT DOWN SOFTWARE COMPONENTS IN AN ORDERED SEQUENCE," by Buskins, et al., Ser. No. 10/867,946 filed on Jun. 14, 2004;

"MANAGER COMPONENT RESOURCE ADDITION AND/OR RESOURCE REMOVAL ON BEHALF OF DISTRIBUTED SOFTWARE APPLICATION," by Gong, et al., Ser. No. 10/868,144, filed on Jun. 14, 2004 now U.S. Pat. No. 7,406,678;

"SUBSTITUTE MANAGER COMPONENT THAT OBTAINS STATE INFORMATION OF ONE OR MORE SOFTWARE COMPONENTS UPON FAILURE OF A FIRST MANAGER COMPONENT," by Buskins, et al., Ser. No. 10/868,472, filed on Jun. 14, 2004 now U.S. Pat. No. 7,386,556.

TECHNICAL FIELD

The invention relates generally to distributed software applications and more particularly to management of distributed software applications.

BACKGROUND

In known distributed software applications, software components are distributed among a plurality of executables (i.e., software capsules or software entities). Each of the executables contains one or more software components that perform some portion of the functionality of the distributed software application. For distributed software applications to work, the software components need to interact with each other. For example, the communication between the software components occurs across communication channels between the software components.

To establish communication channels between the software components, software developers would need to write special software in each of the software components to handle setting up communication channels. Upon determination that a communication channel is needed to another software component, a software component negotiates with the other software component in attempt to set up the communication channel to the other software component.

As one shortcoming, the initiating software component that attempts to set up the communication channel may not be aware of the current state of other software components of the software application. If an initiating software component attempts to set up a communication channel with another software component that is not in a valid state for communication channel setup, then setting up the communication channel will fail. As another shortcoming, if software components at the other end of the communication channel fail, the initiating software component may not be aware of the failure at the other end. As yet another shortcoming, the software developers must write extra software for each software component to manage (i.e., setup and maintain) communication channels. The extra software may need to be customized for a specific software application or system. Creating software for each software component to manage communication channels increases the amount of effort required by the software developers to create the software components.

Thus, a need exists to alleviate software components of the responsibility of setting up and maintaining communication channels.

SUMMARY

A distributed software application is distributed among a plurality of executables. Each of the executables contains one or more software components that perform some portion of the functionality of the distributed software application. A manager component of a management infrastructure for the distributed software application controls setup and teardown of communication channels between the software components. The manager component instructs management support software coupled with application software in the software components to set up, maintain, and tear down the communication channels for the software components.

In one embodiment, there is provided an apparatus comprising a manager component that upon receipt of an indication of a need for a communication channel between a first software component and a second software component, instructs management support software of the first software component to set up the communication channel between the first software component and the second software component.

In another embodiment, there is provided a method for: receiving an indication of a need for a communication channel between a first software component and a second software component; and passing identification information of the second software component to management support software of the first software component to instruct the management support software to set up the communication channel between the first software component and the second software component.

In yet another embodiment, there is provided a method for: inputting a configuration file into a code generator to create management support software for a management infrastructure, wherein the configuration file indicates that during operation of a distributed software application a first software component of the distributed software application needs to communicate with a second software component of the distributed software application; coupling the management support software with application software in the first software component; and configuring the management support software to set up a communication channel between the first software component and the second software component upon instruction from a manager component of the management infrastructure.

DESCRIPTION OF THE DRAWINGS

Features of exemplary implementations of the invention will become apparent from the description, the claims, and the accompanying drawings in which:

DETAILED DESCRIPTION

Figure 1:
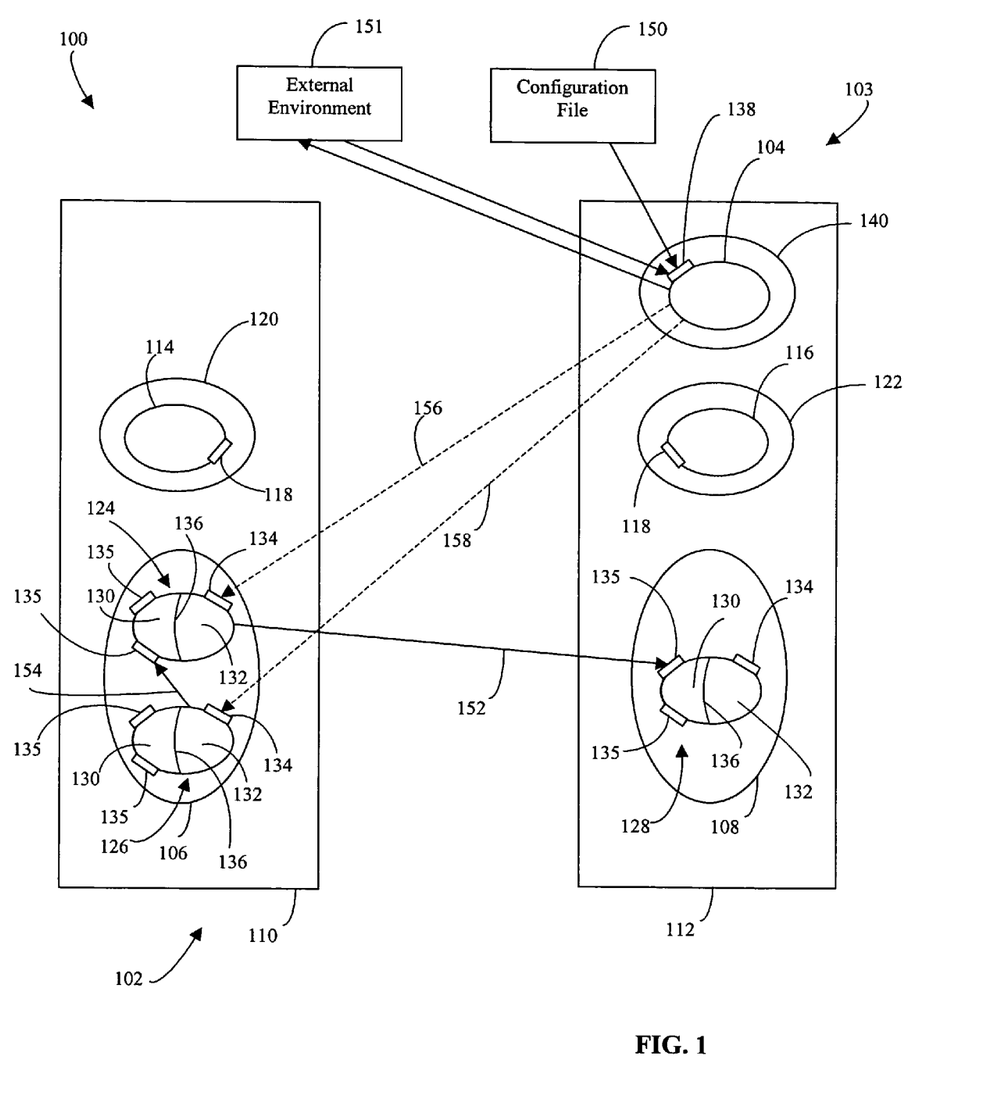
FIG. 1 is a representation of an exemplary implementation of an apparatus that comprises a distributed software application and a management infrastructure.

Turning to FIG. 1, an apparatus 100 in one example comprises a distributed software application 102 and a management infrastructure 103. The management infrastructure 103 performs one or more management operations on the distributed software application 102. The management infrastructure 103 comprises a manager component 104. For example, the manager component 104 may coordinate one or more of starting, stopping, initializing, shutting down, and monitoring the distributed software application 102, detecting failures of the distributed software application 102, recovering the distributed software application 102, propagating state changes about distributed software application 102, and the like.

The distributed software application 102 represents a software application divided among a plurality of executables (i.e., software capsules or software entities). For example, the distributed software application 102 comprises a plurality of executables 106 and 108. The distributed software application 102 may run on a single central processing unit ("CPU") or may be divided between multiple CPUs. For example, the executable 106 may run on processor 110 and the executable 108 may run on processor 112. The processor 110 comprises an executable manager 114 and the processor 112 comprises an executable manager 116. The executable managers 114 and 116 in one example are part of the management infrastructure 103.

The executable managers 114 and 116 start, stop and monitor executables of the distributed software application 102 that run on the processors 110 and 112, such as the executables 106 and 108. To start or stop the executable 106, the executable manager 114 invokes operating system commands to start or stop the executable 106. The executable managers 114 and 116 monitor communication channels and/ or diagnostics on behalf of the executables 106 and 108. Should one or more of the executables 106 and 108 fail, the respective one of the executable managers 114 and 116 informs the manager component 104.

To detect failures of the executables 106 and 108 the executable managers 114 and 116 register with an operating system to receive notifications when the executables 106 and 108 terminate either abnormally or as a result of explicit commands sent to the executables 106 and 108. To detect failures of software components 124, 126 and 128 within the executables 106 and 108, the executable managers 114 and 116 send status queries to the software components 124, 126 and 128 and expect to receive status responses from the software components 124, 126 and 128.

Each of the executable managers 114 and 116 comprise a communication interface 118 for communication with the manager component 104. The executable managers 114 and 116 receive instruction from the manager component 104. For example, the executable managers 114 and 116 may receive instructions at the communication interface 118 from the manager component 104. The executable manager 114 is encapsulated in an executable 120 running on the processor 110 and the executable manager 116 is encapsulated in an executable 122 running on the processor 112.

The executables 106 and 108 comprise one or more software components 124, 126 and 128. For example, the executable 106 encapsulates the software components 124 and 126 and the executable 108 encapsulates the software component 128. Within each of the executables 106 and 108 may be tens, hundreds, or even thousands of other software components (e.g., analogous to the software components 124, 126 and 128).

The software components 124, 126 and 128 represent software sub-entities of the executables 106 and 108. For example, the software components 124, 126 and 128 represent logical blocks of software of the executables 106 and 108. The software components 124 and 126 in one example are developed independently and then put together within the executable 106. The software components 124, 126 and 128 each perform some portion of the overall functionality of the distributed software application 102. The software components 124, 126 and 128 work together to make the distributed software application 102 achieve the desired operation. The distributed software application 102 may provide any functionality for a computer system. The distributed software application 102 in one example comprises a call processing software application. For example, the distributed software application 102 sets up and/or tears down telecommunication sessions in a telecommunication network.

In one embodiment, each of the software components 124, 126 and 128 comprise application software 130, management support software 132, a management support software communication interface 134, and one or more application software communication interfaces 135. The software components 124, 126 and 128 employ the management support software communication interface 134 to receive communications from the manager component 104. The software components 124, 126 and 128 employ the application software communication interfaces 135 to receive communications from other software components of the software components 124, 126 and 128. An application programming interface ("API") 136 communicatively couples the application software 130 with the management support software 132 in each of the software components 124, 126 and 128. The application software 130 and the management support software 132 can exchange information through the application programming interface 136.

The application software 130 is the portion of the software components 124, 126 and 128 that performs some portion of the overall functionality of the distributed software application 102. The management support software 132 is the portion of the software components 124, 126 and 128 that cooperates with the manager component 104 to perform management operations on the software components 124, 126 and 128. For example, the management support software 132 communicatively couples the software components 124, 126 and 128 to allow the application software 130 to perform some portion of the overall functionality of the distributed software application 102. The application software 130 is part of the distributed software application 102 and the management support software 132 is part of the management infrastructure 103.

An application developer creates the application software 130 of the software components 124, 126 and 128 to achieve the designated functionality of the software components 124, 126 and 128. For example, the application developer creates the application software 130 of the software components 124, 126 and 128 to achieve the overall functionality of the distributed software application 102.

To alleviate the application developers from being required to write software into each of the software components 124, 126 and 128 to interconnect the software components 124, 126 and 128, a code generator in one example automatically generates the management support software 132. The management support software 132, under direction of the manager component 104, sets up any necessary communication channels between the software components 124, 126 and 128. To create the management support software 132, a configuration file 150 in one example is input into the code generator. The configuration file 150 comprises connection information and/or architecture information of the distributed software application 102. The code generator creates code for the management support software 132. The code for the management support software 132 is compiled and linked with the application software 130 in the software components 124, 126 and 128. The management support software 132 may be different for each of the software components 124, 126 and 128, as will be appreciated by those skilled in the art.

The manager component 104 comprises a communication interface 138 for receiving incoming communications. The communication interface 138 is employable for receiving the configuration file 150. The manager component 104 may employ other means to receive the configuration file 150, such as reading the configuration file 150 directly from a disk or file system. The communication interface 138 may receive communications from the executable managers 114 and 116, as well as communications from the software components 124, 126 and 128.

The manager component 104 may also use the communication interface 138 for receipt of external system information from an external environment 151. In one example, the external environment 151 represents other components of the system that are in communication with the manager component 104. In another example, the external environment 151 represents another management infrastructure in communication with the management infrastructure 103.

The manager component 104 is encapsulated with zero or more other software components in an executable 140. The executable 140 that contains the manager component 104 may be run on either of the processors 110 and 112. The manager component 104 in one example is active and the apparatus 100 may have one or more standby manager components (e.g., analogous to the manager component 104). If the manager component 104 fails, then one of the standby manager components becomes active and gains managerial control of the distributed software application 102.

One advantage to the manager component 104 controlling setup and teardown of communication channels is that the manager component 104 alleviates application developers from being required to write software into each of the software components 124, 126 and 128 to set up, handle, and tear down communication channels. The manager component 104 controls communication channels between the software components 124, 126 and 128 on behalf of the software components 124, 126 and 128. For example, the manager component 104 interfaces with the management support software 132 coupled with the application software 130 in the software components 124, 126 and 128 to set up, manage, and tear down the communication channels for the software components 124, 126 and 128. Therefore, the manager component 104 saves the application developers effort of creating software to manage communication channels.

Another advantage of the manager component 104 controlling setup and teardown of communication channels is that the manager component 104 knows state information of the software components 124, 126 and 128. The manager component 104 in one example wants to set up a communication channel from the software component 124 to the software component 128. The manager component 104 is able to wait for both of the software components 124 and 128 to be in a valid state for set up of the communication channel before instructing the management support software 132 of the software component 124 to set up the communication channel to the software component 128. Therefore, the manager component 104 serves to prevent wasted attempts to set up communication channels when one or more of the software components 124 and 128 are in invalid states.

The management infrastructure 103 provides management functionality as a reusable asset for distributed software applications. The management infrastructure 103 in one example comprises a portion of a high availability ("HA") infrastructure. The manager component 104 in one example comprises a high availability manager component operating in a high availability infrastructure. The high availability infrastructure controls management operations on the software components 124, 126 and 128 for the distributed software application 102. For example, the high availability infrastructure handles setting up and tearing down communication channels between the software components 124, 126 and 128 for the software components 124, 126 and 128. The high availability infrastructure is usable to control management operations for the distributed software application 102 or another distributed software application. The high availability infrastructure is able to continue processing while switching between active and standby components in the high availability infrastructure.

For the distributed software application 102 to work, the software components 124, 126 and 128 need to interact with each other. The software components 124, 126 and 128 interact by passing messages. Before the software components 124, 126 and 128 can pass messages, the manager component 104 needs to set up communication channels for the software components 124, 126 and 128. Each of the software components 124, 126 and 128 may comprise a plurality of the application software communication interfaces 135, so each of the software components 124, 126 and 128 are able to have a plurality of incoming communication channels.

Upon receipt of an indication of a need for a communication channel between a first one of the software components 124, 126 and 128 and a second one of the software components 124, 126 and 128, the manager component 104 instructs management support software 132 of the first one of the software components 124, 126 and 128 to set up the communication channel to the second one of the software components 124, 126 and 128. To begin the set up of communication channels, the manager component 104 imports the configuration file 150 that comprises connection information and architecture information of the distributed software application 102. The configuration file 150 indicates which of the software components 124, 126 and 128 need communication channels to others of the software components 124, 126 and 128. For example, the configuration file 150 in one example comprises a list of pairs of the software components 124, 126 and 128 that need communication paths. The configuration file 150 may be appended to include new pairs of the software components 124, 126 and 128 that need communication paths. The configuration file 150 may also be updated to change previously indicated pairs of the software components 124, 126 and 128. To update the list of pairs, a developer would access the configuration file 150 and update the list of pairs to reflect any new changes to the distributed software application 102.

The configuration file 150 in one example may indicate a need for a communication channel between the software component 124 and the software component 128. The manager component 104, as part of the high availability service provided, will interact with the management support software 132 for software component 124 to automatically set up the communication channel on behalf of the software components 124 and 128. The executable manager components 114 and 116 will monitor the communication channel on behalf of the software components 124 and 128. Should the software components 124 and 128 fail and be recovered, the manager component 104 will be informed of the failure by one or more of the executable manager components 114 and 116, and will re-establish the communication channel between the software components 124 and 128.

To set up the communication channel, the manager component 104 instructs the management support software 132 of the software component 124 to set up the communication channel to the software component 128. The manager component 104 needs to relay instructions for setting up the communication channel to the management support software 132 of the software component 124. In one example, the manager component 104 sends the instructions in a message to the management support software communication interface 134 of the software component 124. In another example, the manager component 104 could pass the instructions via function call. In yet another example, the manager component 104 could pass the instructions by setting bits in shared memory. The management support software 132 of the software component 124 would access the bits from the shared memory to receive the instructions for setting up the communication channel. After setup of the communication channel, the management support software 132 sends a confirmation notification to the manager component 104 to indicate success of the setup.

Communication between the manager component 104 and the management support software 132 of the software components 124, 126 and 128 is resilient to failure. For example, the messages may employ timeouts to handle dropped or delayed messages or confirmation notifications. Based on detection of a non-responsive software component of the software components 124, 126 and 128, the manager component 104 may determine that non-responsive software component has failed. The manager component 104 may then initiate a recovery operation on the non-responsive software component.

In one example, the manager component 104 sends a message to the management support software 132 to instruct the management support software 132 to set up a single communication channel. In another example, the message instructs the management support software 132 to set up a plurality of communication channels. The manager component 104 may send the message to set up one or more communication channels and/or close one or more channels. For example, the manager component 104 may send a single message that instructs the management support software 132 to close a first communication channel and set up a second channel.

The manager component 104 may also instruct the management support software 132 to tear down a communication channel. For example, the manager component 104 may determine or receive a request that indicates a desire or intent to tear down the communication channel. In one example, the manager component 104 may tear down the communication channel to end communication between any two of the software components 124, 126 and 128. In another example, the manager component 104 may tear down the communication channel upon failure of one or more of the software components 124, 126 and 128. In yet another example, the manager component 104 may tear down the communication channel to perform software upgrades to one or more of the software components 124, 126 and 128.

To tear down the communication channel, the manager component 104 in one example instructs the management support software 132 of the software component 124 to tear down the communication channel to the software component 128. The manager component 104 needs to relay instructions for tearing down the communication channel to the management support software 132 of the software component 124. The manager component 104 relays the instructions to tear down the communication channel analogously to the relay of instructions for setting up the communication channel, as described herein. After teardown of the communication channel, the management support software 132 sends a confirmation notification to the manager component 104 to indicate success of the shutdown.

Figure 2:
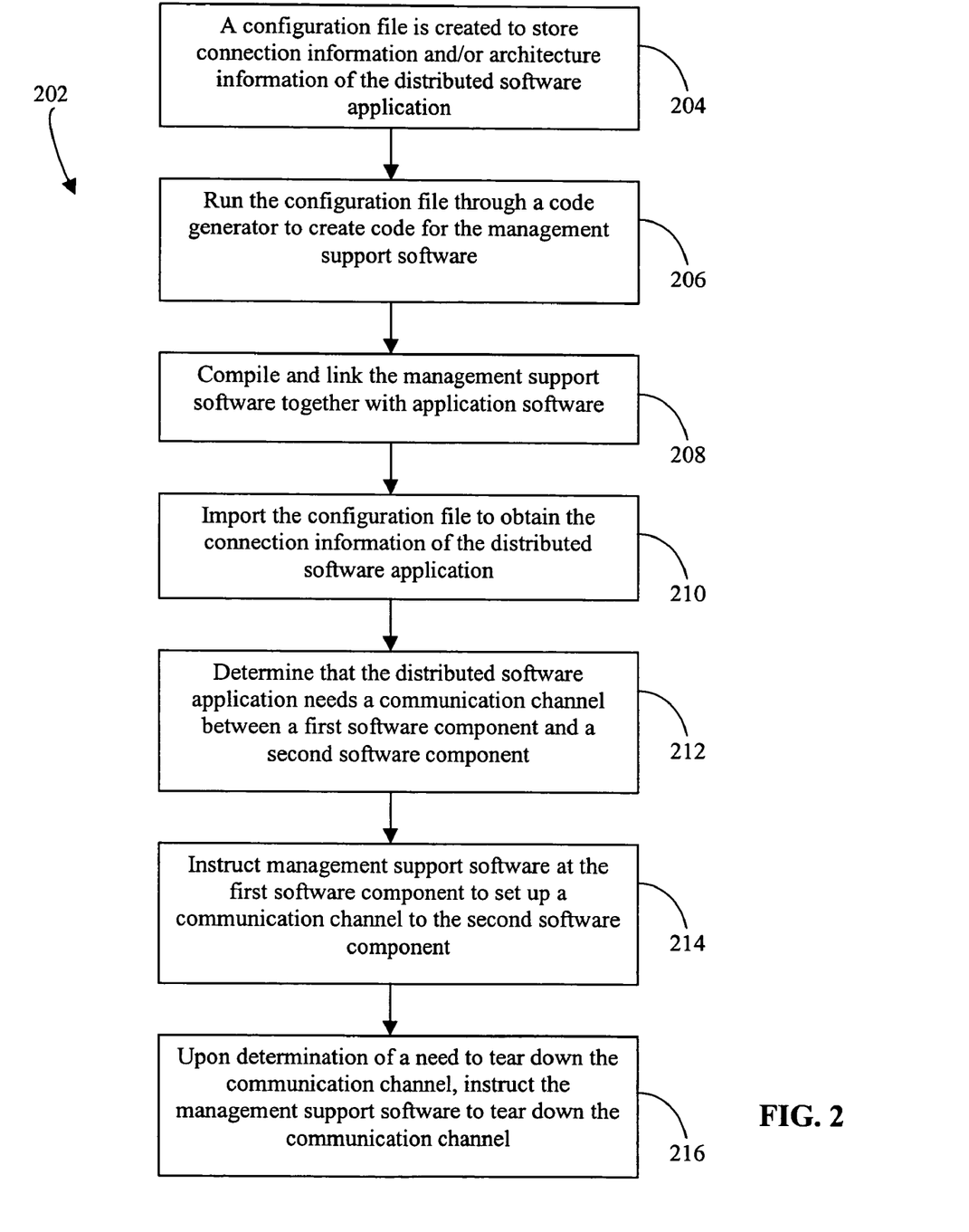
FIG. 2 is a representation of exemplary logic that serves to allow a manager component of the management infrastructure to set up and tear down communication channels between a plurality of software components of the distributed software application of the apparatus of FIG. 1.

Turning to FIGS. 1-2, an illustrative description of one exemplary operation of the apparatus 100 is now presented, for explanatory purposes. The manager component 104 comprises a high availability manager component operating in a high availability infrastructure. To begin operation of the apparatus 100, the distributed software application 102 is configured for control by the manager component 104, and the manager component 104 coordinates the initialization of the distributed software application 102. Exemplary logic 202 serves to allow the manager component 104 to set up and tear down communication channels between the software components 124, 126 and 128. The logic 202 employs one or more steps, for example, STEPS 204, 206, 208, 210, 212, 214, and 216. An application developer, a system architect, or any other developer performs the STEPS 204, 206, and 208 of FIG. 2 and the manager component 104 performs the STEPS 210, 212, 214 and 216 of FIG. 2.

At STEP 204, the configuration file 150 is created to store connection information and/or architecture information of the distributed software application 102. The configuration file 150 indicates which of the software components 124, 126 and 128 need to communicate with each other. For example, the configuration file 150 may indicate a need for a communication channel 152 from the software component 124 to the software component 128. The configuration file 150 may also indicate a need for a communication channel 154 from the software component 126 to the software component 124.

At STEP 206, after the configuration file 150 has been written to comprise a complete representation of the required connection information for the distributed software application 102, the configuration file 150 is run through a code generator to create code for the management support software 132. The code generator creates object reference tables that store communication channel information for each possible type of the application software communication interfaces 135 that are used by the software components 124, 126 and 128.

An application developer writes code for the application software 130 to perform some portion of the overall functionality of the distributed software application 102. At STEP 208, to create the software component 124, the code for the application software 130 is compiled, the code for the management support software 132 is compiled, and then the management support software 132 is linked together with the application software 130. The software components 126 and 128 are created analogously to the software component 124, as described herein.

At STEP 210, upon startup of the manager component 104, the manager component 104 receives the configuration file 150. For example, the configuration file 150 is sent to the communication interface 138 of the manager component 104. At STEP 212, the manager component 104 analyzes the configuration file 150 to determine which of the software components 124, 126 and 128 need to communicate with each other. For example, the manager component 104 determines that the software component 124 needs a communication channel 152 to the software component 128 and the software component 126 needs a communication channel 154 to the software component 124.

At STEP 214, to setup the communication channel 152, the manager component 104 instructs the management support software 132 of the software component 124 to set up the communication channel 152 to the software component 128. For example, the manager component 104 sends a message 156 to the management support software communication interface 134 of the software component 124. The message 156 in one example comprises identification and/or location information of the software component 128 to instruct the management support software 132 of the software component 124 to set up the communication channel 152 to the software component 128. The message 156 indicates which one of the application software communication interfaces 135 of the software component 128 is the target for the communication channel 152. To setup the communication channel 154, the manager component 104 instructs the management support software 132 of the software component 126 to set up the communication channel 154 to the software component 124, analogously to the setup of the communication channel 152, as described herein.

Upon receipt of the messages 156 and 158 to set up the respective communication channels 152 and 154, the management support software 132 of the software components 124 and 126 begins to set up the communication channels 152 and 154. For example, the management support software 132 employs the identification information of the software components 128 and 124 from the messages 156 and 158 and local information about the operating system platforms and/or communication mechanisms to create the communication channels 152 and 154.

At STEP 216, to tear down one of the communication channels 152 and 154, the manager component 104 instructs the management support software 132 of the appropriate one of the software components 124 and 126 to tear down the one of the communication channels 152 and 154. For example, the manager component 104 sends a teardown message to the management support software communication interface 134 of the software component 124. The teardown message in one example comprises an indication of the communication channel 152 to instruct the management support software 132 of the software component 124 to tear down the communication channel 152.

Upon completion of the setup or teardown of a communication channel, the management support software 132 may notify the application software 130. For example, once the management support software 132 has set up the communication channel 152, the management support software 132 employs the application programming interface 136 to notify the application software 130 of the existence of the communication channel 152. A single notification from the management support software 132 to the application software 130 may refer to a single communication channel or a plurality of communication channels.

If the communication channel 152 fails or is torn down, the management support software 132 may notify the application software 130 that the communication channel 152 is currently unavailable for communication. Upon failure of the communication channel 152, one or more failure detection components (e.g., one or more of the executable managers 114 and 116) may alert the manager component 104 of the failure. The failure detection components may also alert the manager component 104 upon failure of the one or more of the software components 124, 126 and 128, the executables 106 and 108, and/or the processors 110 and 112, as will be appreciated by those skilled in the art. After any necessary recovery actions have taken place, the manager component 104 may then instruct the management support software 132 to reestablish the communication channel 152. Once the manager component 104 reestablishes the communication channel, the management support software 132 would then notify the application software 130 that the communication channel is again available for communication. If the software component 128 in one example becomes unavailable and it is desirable to not close the communication channel 152, then the management support software 132 could notify the application software 130 that the communication channel 152 is available, but in an invalid state since the software component 128 is unavailable.

Once the management support software 132 has set up the communication channel 152, the application software 130 of the software component 124 needs a logical identifier of the communication channel 152 to use the communication channel 152. The logical identifier of the communication channel 152 may comprise identification information of the software component 128, identification information of the application software communication interface 135 of the software component 128, and/or identification information of the communication channel 152. The management support software 132 in one example assigns different logical identifiers to each of the communication channels 152 and 154. The management support software 132 in one example generates a specific type of logical identifier to match the type of application software communication interface 135. The logical identifiers must be known by the application software 130, and may be derived from a variety of sources, including information specified in the configuration file 150.

For the application software 130 of the software component 124 to be able use the communication channel 152, the application software 130 of the software components 124 and 126 can employ logical identifiers of the communication channels 152 and 154 to direct communications over the communication channels 152 and 154 to the software components 128 and 124, respectively. In one example, the application software 130 of the software components 124 and 126 employ Common Object Request Broker Architecture ("CORBA") as a communication transport across the communication channels 152 and 154. In another example, the application software 130 employs Transmission Control Protocol/Internet Protocol ("TCP/IP") as the communication transport across the communication channels 152 and 154. Other examples utilizing different communication transports are also possible, as will be appreciated by those skilled in the art.

The apparatus 100 in one example comprises a plurality of components such as one or more of electronic components, hardware components, and/or computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise recordable data storage medium of the manager component 104. The computer-readable signal-bearing medium for the apparatus 100 in one example comprise one or more of a magnetic, electrical, optical, biological, and atomic data storage medium. For example, the computer-readable signal-bearing medium comprises floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network. The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
    a processor for executing a manager component that upon receipt of an indication of a need for a direct communication channel between a first software component and a second software component, instructs management support software of the first software component to set up the direct communication channel between the first software component and the second software component, wherein only the manager component sets up, handles, and tears down communication channels instead of each software component, and wherein the manager component knows state information of each software component and wherein the manager component waits for each software component to be in a valid state for set up of the communication channel before instruction the management support software of each software, component to set up the communication channel between the software components;
    wherein a plurality of software components of a distributed software application comprise the first software component and the second software component; wherein the manager component together with the management support software provide communication channel management functionality for the plurality of software components of the distributed software application;
    wherein the manager component imports a configuration file that comprises the indication of the need for the direct communication channel between the first software component and the second software component;
    wherein the manager component employs the configuration file to determine a plurality of communication pairs of the plurality of software components, wherein the manager component sets up a direct communication channel for each of the plurality of communication pairs.

2. The apparatus of claim 1, wherein the manager component is external to the first and second software components;
    wherein the manager component sends a message to the management support software of the first Software component, wherein the message comprises identification and/or location information of the second software component to instruct the management support software of the first software component to set up the direct communication channel to the second software component.

3. The apparatus of claim 1, wherein the manager component comprises a high availability manager component Operating in a high availability infrastructure, wherein the high availability manager component sets up and controls the direct communication channel for the first and second software components;
    wherein upon a failure of the direct communication channel, one or more failure detection components alert the manager component of the failure;
    wherein after any necessary recovery actions have taken place, the manager component instructs the management support software of the first software component to reestablish the direct communication channel between the first and second software components.

4. The apparatus of claim 1, wherein the manager component knows state information of the first and second software components; wherein the manager component waits for both of the first and second software components to be in a valid state for Set up of the direct communication channel before instructing the management support software to set up the direct communication channel from the first soft-ware component to the second software component.

5. The apparatus of claim 1, wherein the direct communication channel comprises a first communication channel for communication from the first software component to the second software component;
    wherein upon receipt of an indication of a need for a second communication channel for communication from the second software component to the first software component, the manager component instructs management support software of the second software component to set up the second communication channel from the second software component to the first software component.

6. The apparatus of claim 1 in combination with the management support software, wherein the first software component comprises an application programming interface for communication between the management support software and application software in the first software component;
   wherein the application software of the first software component employs an identifier of the direct communication channel to direct one or more messages across the direct communication channel to the second software component.

7. The apparatus of claim 6, wherein upon setup of the direct communication channel, the management support software employs the application programming interface to notify the application software that the direct communication channel is operable;
   wherein upon tear down of direct the communication channel, the management support software employs the application programming interface to notify the application software that the direct communication channel is non-operable.

8. The apparatus of claim 1, wherein after get up of the direct communication channel, the manager component sends, to the management support software, a teardown message that comprises an indication of the direct communication channel;
   wherein the teardown message instructs the management support software to tear down the direct communication channel.

9. The apparatus of claim 1 in combination with the management support software;
   wherein a configuration file, that comprises the indication of the need for the communication channel between the first software component and the second software component, is input into a code generator to create the management support software; wherein the management support software is coupled with application software in the first software component;
   wherein the management support software communicates with both the manager component and application software of the first software component.

10. The apparatus of claim 1, wherein the management support software sets up the communication channel between the first software component and the second software component, wherein the first software component employs Common Object Request Broker Architecture ("CORBA") or Transmission Control Protocol/Interact Protocol ("TCP/IP") as a communication transport across the direct communication channel to the second software component.

11. The apparatus of claim 1, wherein a distributed software application comprises the first and second software components, wherein the distributed software application comprises a call processing software application, wherein the first and second software components perform a portion of the overall functionality of the call processing software application;
   wherein the manager component oversees communication channel setup and teardown internal to the call processing software application.

12. The apparatus of claim 1, wherein the first software component runs on a first processor and the second software component runs on a second processor;
   wherein the manager component instructs the management support software of the first software component running on the first processor to set up the direct communication channel to the second software component running on the second processor.

13. A method, comprising the steps of:
   receiving an indication of a need for a direct communication channel between a thirst software component and a second software component; and
   passing identification information of the second software component to management support software of the first software component to instruct the management support software to set up the direct communication channel between the first software component and the second software component, wherein only a manager component sets up, handles, and tears down communication channels instead of each software component, and wherein the manager component knows state information of each software component and wherein the manage component waits for each software component to be in a valid state for set up of the communication channel before instructing the management support software of each software component to set up the communication channel between the software components;
      wherein a plurality of software components of a distributed software application comprise the first software component and the second software component;
   wherein the manager component together with the management support software provide communication channel management functionality for the plurality of software components of the distributed software application;
      wherein the manager component imports a configuration file that comprises the indication of the need for the direct communication channel between the first software component and the second software component;
      wherein the manager component employs the configuration file to determine a plurality of communication pairs of the plurality of software components, wherein the manager component sets up a direct communication channel for each of the plurality of communication pairs.

14. The method of claim 13, wherein the step of receiving the indication of the need for the direct communication channel between the first software component and the second software component comprises the steps of:
   importing a configuration file that comprises the indication of the need for the direct communication channel between the first software component and the second software component;
   employing the configuration file to determine a plurality of communication pairs of software components; and
   setting up a direct communication channel between each of the plurality of communication pairs of software components on behalf of the plurality of communication pairs of software components.

15. The method of claim 13, wherein the step of passing the identification information of the second software component to the management support software of the first software component to instruct the management support software to set up the direct communication channel between the first software component and the second software component comprises the steps of:
   obtaining state information of the first and second software components; and waiting for both of the first and second software components to be in a valid state for set up of the direct communication channel before instructing the management support software to set up the direct communication channel from the first software component to the second software component.

16. The method of claim 13, wherein a software application comprises the first and second software components, wherein the step of passing the identification information of the second software component to the management support software of the first software component to instruct the management support software to set up the direct communication channel between the first software component and the second software component comprises the steps of:

running the software application in a high availability infrastructure; monitoring the first and second software components from the high availability infrastructure; and     controlling the direct communication channel from the high availability infrastructure for the first and second software components.

17. The method of claim 13, wherein the management support software employs an application programming interface to communicate with application software in the first software component, the method further comprising the steps of:

notifying the application software through the application programming interface, upon setup of the direct communication channel, that the communication channel is operable;

employing, by the application software, an identifier of the direct communication channel to direct one or more messages across the direct communication channel; and     notifying the application software through the application programming interface, upon tear down of the direct communication channel, that the direct communication channel is non-operable.

18. A method, comprising the steps of:

inputting a configuration file into a code generator to create management support software for a management infrastructure, wherein the configuration file indicates that during operation of a distributed software application a first software-component of the distributed software application needs to communicate with a second software component of the distributed software application;

coupling the management support software with application software in the first software component; and     configuring the management support software to set up a direct communication channel between the first software component and the second software component upon instruction from a manager component of the management infrastructure, wherein only the manager component sets up, handles, and tears down communication channels instead of each software component, and wherein the manager component knows state information of each software component and wherein the manager component waits for each software component to be in a valid state for set up of the communication channel before instructing the management support software of each software component to set up the communication channel between the software component;

wherein a plurality of software components of a distributed software application comprise the first software component and the second software component;

wherein the manager component together with the management support software provide communication channel management functionality for the plurality of software components of the distributed software application;

wherein the manager component imports a configuration file that comprises the indication of the need for the direct communication channel between the first software component and the second software component;

wherein the manager component employs the configuration file to determine a plurality of communication pairs of the plurality of software components, wherein the manager component sets up a direct communication channel for each of the plurality of communication pairs.

* * * * *

UNITED STATES PATENT AND TRADEMARK OFFICE
CERTIFICATE OF CORRECTION

PATENT NO.       : 7,627,871 B2
APPLICATION NO. : 10/868128
DATED            : December 1, 2009
INVENTOR(S)      : Buskens et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1163 days.

Signed and Sealed this

Twenty-first Day of December, 2010

David J. Kappos
*Director of the United States Patent and Trademark Office*